(12) United States Patent
Papakonstantopoulos et al.

(10) Patent No.: US 12,378,327 B2
(45) Date of Patent: Aug. 5, 2025

(54) METHOD OF MAKING A SILICA/CELLULOSE HYBRID

(71) Applicant: THE GOODYEAR TIRE & RUBBER COMPANY, Akron, OH (US)

(72) Inventors: George Jim Papakonstantopoulos, Medina, OH (US); Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 792 days.

(21) Appl. No.: 17/527,333

(22) Filed: Nov. 16, 2021

(65) Prior Publication Data

US 2022/0169752 A1    Jun. 2, 2022

Related U.S. Application Data

(60) Provisional application No. 63/120,300, filed on Dec. 2, 2020.

(51) Int. Cl.
*C08B 15/00* (2006.01)
*C08B 15/05* (2006.01)
(Continued)

(52) U.S. Cl.
CPC ............ *C08B 15/05* (2013.01); *C08L 1/08* (2013.01); *C08L 9/06* (2013.01); *C09C 1/3072* (2013.01); *C09C 3/10* (2013.01); *C08L 2310/00* (2013.01)

(58) Field of Classification Search
CPC ... C08B 15/05; C08L 1/08; C08L 9/06; C08L 2310/00; C08C 3/10; C09C 1/3072;
(Continued)

(56) References Cited

U.S. PATENT DOCUMENTS 4,935,471 A    6/1990  Halasa et al.
5,932,662 A    8/1999  Lawson et al.
(Continued)

FOREIGN PATENT DOCUMENTS

CN    110028702 A  *  7/2019  ............... C08K 3/36
CN    111417677 A     7/2020
WO    WO-2019053602 A1 *  3/2019  ............... B60C 1/00

OTHER PUBLICATIONS

CN110028702A, Translation (Year: 2019).*
(Continued)

*Primary Examiner* — Amber R Orlando
*Assistant Examiner* — Anastasia A. Kuvayskaya
(74) *Attorney, Agent, or Firm* — Alvin T. Rockhill (57) ABSTRACT

It has been found that certain silica/cellulose hybrid compositions can be incorporated into rubber formulations with excellent compatibility between the filler and the rubber being attained. These rubber formulations also offer excellent rubber performance characteristics for utilization in tires and other rubber products. These silica/cellulose compositions are made by (1) dispersing sodium silicate or an alkoxy silane into an aqueous cellulose slurry to make an aqueous cellulose dispersion; (2) maintaining the aqueous cellulose dispersion under agitation for a time which is sufficient to allow the sodium silicate or the alkoxy silane to react with the cellulose; (3) adding an acid to the cellulose dispersion in an amount which is sufficient to reduce the pH of the cellulose dispersion to no more than about 8 to produce the silica/cellulose hybrid; and (4) recovering the silica/cellulose hybrid from the water.

20 Claims, 1 Drawing Sheet

(51) Int. Cl.
*C08L 1/08* (2006.01)
*C08L 9/06* (2006.01)
*C09C 1/28* (2006.01)
*C09C 1/30* (2006.01)
*C09C 3/10* (2006.01)

(58) Field of Classification Search
CPC .... C08J 2301/02; C08J 2401/02; C08J 3/215; C08J 3/203
See application file for complete search history.

(56) References Cited

U.S. PATENT DOCUMENTS

| | | | |
|---|---|---|---|
| 6,057,397 | A | 5/2000 | Takagashi et al. |
| 6,080,835 | A | 6/2000 | Lawson et al. |
| 6,084,025 | A | 7/2000 | Kitamura et al. |
| 6,114,432 | A | 9/2000 | Takagashi et al. |
| 6,211,321 | B1 | 4/2001 | Nakamura |
| 6,344,538 | B1 | 2/2002 | Sheares |
| 6,627,721 | B1 | 9/2003 | Rodewald et al. |
| 7,108,033 | B2 | 9/2006 | Dalphond |
| 7,625,970 | B2 | 12/2009 | Klinkenberg et al. |
| 7,897,662 | B2 | 3/2011 | Klinkenberg et al. |
| 9,273,195 | B2 | 3/2016 | Basu et al. |
| 9,708,473 | B2 | 7/2017 | Basu et al. |
| 9,708,474 | B2 | 7/2017 | Basu et al. |
| 9,708,475 | B2 | 7/2017 | Basu et al. |
| 2018/0237608 | A1* | 8/2018 | Hess .......... C09K 5/14 |

OTHER PUBLICATIONS

Hamouda et al. Factors affecting alkaline sodium silicate gelation for in-depth reservoir profile modification. Energies. 2014. 7, 568-590. (Year: 2014).*

Fu et al. Facilitated fabrication of high strength silica aerogels using cellulose nanofibrils as scaffold, Carbohydrate Polymers, 147, 2016, pp. 89-96 (Year: 2016).*

Extended European Search Report dated May 9, 2022 for European Patent Application No. 21211802.0 which is the European counterpart to the subject patent application.

Database WPI, Week 201965, Thomson Scientific, London, GB; AN 2019-651276 & CN 220 028 702 A (Jinan Shengquan Group Share Holding Co L) Jul. 19, 2019.

Database WPI, Week 201738, Thomson Scientific, London, GB; AN 2017-210910 & CN 2106 519 352 A (Univ Qingdao Sci & Technology) Mar. 22, 2017.

Database WPI, Week 202007, Thomson Scientific, London, GB; AN 2020-82397P & CN 111 423 633 A (Hangzhou Ruiqi Chem Technology Co Ltd.) Jul. 17, 2020.

Chinese Decision on Rejection dated Jan. 26, 2025 (with English Report).

* cited by examiner

METHOD OF MAKING A SILICA/CELLULOSE HYBRID

This application claims benefit of U.S. Provisional Patent Application Ser. No. 62/120,300, filed on Dec. 2, 2020. The teachings of U.S. Provisional Patent Application Ser. No. 62/120,300 are incorporated herein by reference in their entirety.

BACKGROUND OF THE INVENTION

Rubber formulations utilized in making rubber articles typically contain a filler, such as carbon black, silica, clay, or cellulose, to attain desired physical and chemical characteristics. The interaction between rubber and the filler in such rubber compositions has a profound effect on the physical properties of vulcanized rubber. In fact, the interaction between the rubber and the filler regulates the degree of dispersion of the filler, the formation of elastomer-filler interface, and filler-filler networks. All of these interactions have a significant effect of the physical properties of the cured rubber composition, such as stress-strain properties, energy loss under cyclic load, abrasion resistance, and tear propagation resistance. Increased polymer filler interaction enables dispersion the filler to a finer degree to achieve a higher level of reinforcement. It also permits the incorporation of higher amounts of the filler and/or for the incorporation of fillers which cannot be properly dispersed into conventional rubbers.

The importance of attaining better rubber/filler interaction has been appreciated for many years and has been the subject of numerous research projects throughout the rubber industry and within academic settings. Attaining improved rubber/filler interaction is of particular interest to manufacturers of rubber products, such as tires, hoses, power transmission belts, conveyor belts, air springs, windshield wiper blades, and a multitude of other industrial rubber products and consumer goods. One recognized approach for attaining better compatibility between rubbery polymers and fillers is to functionalize the rubbery polymer with moieties that improved interaction with the filler. For instance, rubbery polymers can be functionalized with amines to attain better interaction with carbon black and silica.

U.S. Pat. No. 4,935,471 discloses a process for preparing a polydiene having a high level of affinity for carbon black which comprises reacting a metal terminated polydiene with a capping agent selected from the group consisting of (a) halogenated nitriles having the structural formula X-A-C≡N, wherein X represents a halogen atom and wherein A represents an alkylene group containing from 1 to 20 carbon atoms, (b) heterocyclic aromatic nitrogen containing compounds, and (c) alkyl benzoates. The capping agents disclosed by U.S. Pat. No. 4,935,471 react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrile, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pteridinyl group, a .beta.-carbolinyl group, a perimidinyl group, a phenanthrolinyl group or the like.

U.S. Pat. No. 4,935,471 also discloses that lithium amides are highly preferred initiators because they can be used to prepare polydienes which are terminated with polar groups at both ends of their polymer chains. The extra polar functionality provided by lithium amides results in increased interaction with carbon black resulting in better polymer-carbon black dispersion. The lithium amides disclosed by U.S. Pat. No. 4,935,471 include lithium pyrrolidide. U.S. Pat. No. 4,935,471 also indicates that preferred initiators include amino alkyl lithium compounds of the structural formula:

wherein A represents an alkylene group containing from 1 to 20 carbon atoms, and wherein $R^1$ and $R^2$ can be the same or different and represent alkyl groups containing from 1 to 20 carbon atoms.

It is also desirable for synthetic rubbers to exhibit low levels of hysteresis. This is particularly important in the case of rubbers that are used in tire tread compounds. Such polymers are normally compounded with sulfur, carbon black, accelerators, antidegradants and other desired rubber chemicals and are then subsequently vulcanized or cured into the form of a useful article. It has been established that the physical properties of such cured rubbers depend upon the degree to which the filler is homogeneously dispersed throughout the rubber. This is in turn related to the level of affinity that filler, such as carbon black, has for the rubber. This can be of practical importance in improving the physical characteristics of rubber articles that are made utilizing polydiene rubbers, such as polybutadiene rubber, polyisoprene rubber, styrene-butadiene rubber, and the like. For example, the rolling resistance and tread wear characteristics of tires can be improved by increasing the affinity of carbon black to the rubbery polymers utilized therein. Therefore, it would be highly desirable to improve the affinity of a given polydiene rubber for the filler. For instance, it is known that a better dispersion of carbon black throughout polydiene rubbers which are utilized in compounding tire tread compositions results in a lower hysteresis value and consequently tires made therefrom have lower rolling resistance. It is also known that a major source of hysteresis is due to polymer chain ends that are not capable of full elastic recovery. Accordingly, improving the affinity of the rubber chain ends to the filler is extremely important in reducing hysteresis.

U.S. Pat. No. 6,080,835 discloses a functionalized elastomer comprising: a functional group defined by the formula:

where $R^1$ is a selected from the group consisting of a divalent alkylene group, an oxy-alkylene group, an amino alkylene group, and a substituted alkylene group, each group having from about 6 to about 20 carbon atoms, $R^2$ is covalently bonded to the elastomer and is selected from the group consisting of a linear-alkylene group, a branched- alkylene group, and a cyclo-alkylene group, each group having from about 2 to about 20 carbon atoms.

U.S. Pat. No. 5,932,662 discloses a method of preparing a polymer comprising: preparing a solution of one or more anionically polymerizable monomers in a solvent; and, polymerizing under effective conditions, said monomers in the presence of a polymerization initiator having the formula:

wherein $R^1$ is a divalent alkylene, an oxy- or amino-alkylene having from 6 to about 20 carbon atoms; and, $R^2$ is a linear-alkylene, branched-alkylene, or cyclo-alkylene having from about 2 to about 20 carbon atoms, Li is a lithium atom bonded directly to a carbon atom of $R^2$; and $R^3$ is a tertiary amino, an alkyl having from about 1 to about 12 carbon atoms; an aryl having from about 6 to about 20 carbon atoms; an alkaryl having from about 7 to about 20 carbon atoms; an alkenyl having from about 2 to about 12 carbon atoms; a cycloalkyl having from about 5 to about 20 carbon atoms; a cycloalkenyl having from about 5 to about 20 carbon atoms; a bicycloalkyl having from about 6 to about 20 carbon atoms; and, a bicycloalkenyl having from about 6 to about 20 carbon atoms; where n is an integer of from 0 to about 10.

U.S. Pat. No. 6,084,025 discloses a functionalized polymer prepared by a process comprising the steps of: preparing a solution of a cyclic amine compound, an organolithium compound, and from 3 to about 300 equivalents, based upon one equivalent of lithium, of a monomer selected from vinyl aromatic monomers, and mixtures thereof, where said cyclic amine compound is defined by the formula:

where $R^2$ is selected from the group consisting of an alkylene, substituted alkylene, bicycloalkane, and oxy- or N-alkylamino-alkylene group having from about 3 to about 16 methylene groups, N is a nitrogen atom, and H is a hydrogen atom, thereby forming a polymerization initiator having the formula $A(SOL)_yLi$, where Li is a lithium atom, SOL is a divalent hydrocarbon group having from 3 to about 300 polymerized monomeric units, y is from 0.5 to about 3, and A is a cyclic amine radical derived from said cyclic amine; charging the solution containing $A(SOL)_yLi$ with from about 0.01 to about 2 equivalents per equivalent of lithium of a chelating reagent, and an organic alkali metal compound selected from compounds having the formula $R^4OM$, $R^5C(O)OM$, $R^6R^7NM$, and $R^8SO_3M$, where $R^4$, $R^5$, $R^6$, $R^7$, and $R^8$ are each selected from alkyls, cycloalkyls, alkenyls, aryls, or phenyls, having from 1 to about 12 carbon atoms; and where M is Na, K, Rb or Cs, and sufficient monomer to form a living polymeric structure; and quenching the living polymeric structure.

U.S. Pat. No. 6,344,538 discloses functionalized monomers and polymerized functionalized monomers selected from the group consisting of 2-(N,N-dimethylaminomethyl)-1,3-butadiene, 2-(N,N-diethylaminomethyl)-1,3-butadiene, 2-(N,N-di-n-propylaminomethyl)-1,3-butadiene, 2-(cyanomethyl)-1,3-butadiene, 2-(aminomethyl)-1,3-butadiene, 2-(hydroxymethyl)-1,3-butadiene, 2-(carboxymethy)-1,3-butadiene, 2-(acetoxymethyl)-1,3-butadiene, 2-(2-alkoxy-2-oxoethyl)-1,3-butadiene, 2,3-bis(cyanomethyl)-1,3-butadiene, 2,3-bis(dialkylaminomethyl)-1,3-butadiene, 2,3-bis(4-ethoxy-4-4-oxobutyl)-1,3-butadiene and 2,3-bis(3-cyanopropyl)-1,3-butadiene, and methods for preparing such functionalized diene monomers and polymers.

U.S. Pat. No. 6,211,321 discloses a diene rubber comprising 40 to 99.99% by weight of combined units of a conjugated diene monomer, 0 to 50% by weight of combined units of an aromatic vinyl monomer, and 0.01 to 20% by weight of combined units of other vinyl monomer comprising at least one of tertiary amino-containing vinyl monomer and halogen-containing vinyl monomer and wherein at least part of said combined other vinyl monomer is quaternized to form quaternized tertiary amino-containing vinyl monomer units, with the provisos that when said other vinyl monomer comprises combined tertiary amino-containing vinyl monomer units it is quaternized with a monohalogenated hydrocarbon and when said other vinyl monomer comprises combined halogen-containing vinyl monomer units it is quaternized with a tertiary amine, and having a Mooney viscosity $ML_{1+4}$ at 100° C. of 10 to 200, wherein the tertiary amino-containing vinyl monomer is a compound of the formula $CH_2=CR^{11}A^2NR^{12}R^{13}$ where $R^{11}$ is a hydrogen atom or a lower alkyl group, $R^{12}$ and $R^{13}$ are each, independently, an alkyl group, an aryl group or an aralkyl group, $A^2$ is an alkylene group, an arylene group, an arylene-alkylene group, an alkylene-arylene group, or a linking group of the general formula $—C(=O)\text{-}M\text{-}R^{14}—$, in which M is an oxy group or an NH group, and $R^{14}$ is an alkylene group, an arylene group, an arylene-alkylene group or an alkylene-arylene group, and $R^{12}$ or $R^{13}$ may be combined with $A^2$ to form a heterocyclic ring, and wherein the combined units of the quaternized tertiary amino-containing vinyl monomer have the formula:

where $R^1$ is a hydrogen atom or a lower alkyl group, $R^2$, $R^3$ and $R^4$, are each, independently, an alkyl group, an aryl group or an aralkyl group, $A^1$ is an alkylene group, an arylene group, an arylene-alkylene group, an alkylene-arylene group, or a linking group of the general formula $—C(=O)\text{-}M\text{-}R^5—$, in which M is an oxy group or an NH group, and $R^5$ is an alkylene group, an arylene group, an arylene-alkylene group or an alkylene-arylene group, and $R^2$ or $R^3$ may be combined with $A^1$ to form a heterocyclic ring, and X is a halogen atom.

U.S. Pat. No. 6,057,397 discloses a silica-containing diene rubber composition that is reported to be superior in resilience (which is an indication of rolling resistance), at least equal, in tensile strength and abrasion resistance, to carbon black-containing diene rubber compositions, and good in processability and hardness characteristics. The silica-containing diene rubber composition disclosed in U.S. Pat. No. 6,057,397 is characterized by containing, as the diene rubber component, a hydroxyl group-containing diene rubber having a weight-average molecular weight of 50,000 or more, or a blend of the hydroxyl group-containing diene rubber and other diene rubber. This composition is produced by a process which uses, as the diene rubber component, a hydroxyl group-containing diene rubber having a weight-average molecular weight of 50,000 or more, or a combination of the hydroxyl group-containing diene rubber and other diene rubber and wherein the mixing of components is conducted by mixing the diene rubber component with at least part of a required amount of silica and then mixing the resulting mixture with the remainder of silica and other compounding agents.

U.S. Pat. No. 6,114,432 discloses a diene rubber composition comprising 100 parts by weight of a diene rubber component composed of 10 to 100 weight percent of an amino group-containing diene copolymer rubber (A) having a composition (based on the bound amount) of 40 99.95 weight percent of a conjugated diene monomer, 0.05 20 weight percent of an amino group-containing monomer and 0 55 weight percent of an aromatic vinyl monomer, and 0 90 weight percent of another diene rubber (B), and 10 150 parts by weight of silica having a specific surface area of 50 220 $m^2/g$ as determined by nitrogen absorption (BET method), and having excellent heat build-up resistance, tensile properties, abrasion properties and processability, and a preparation method thereof.

U.S. Pat. No. 6,627,721 discloses a rubbery polymer which is comprised of repeat units that are derived from (1) at least one conjugated diolefin monomer, and (2) at least one functionalized monomer having of the structural formula:

wherein R represents an alkyl group containing from 1 to about 10 carbon atoms or a hydrogen atom, and wherein $R^1$ and $R^2$ can be the same or different and represent hydrogen atoms or a moiety selected from the group consisting of wherein $R^3$ groups can be the same or different and represent alkyl groups containing from 1 to about 10 carbon atoms, aryl groups, allyl groups, and alkyloxy groups of the structural formula —$(CH_2)_y$—O—$(CH_2)_z$—$CH_3$, wherein Z represents a nitrogen containing heterocyclic compound, wherein $R^4$ represents a member selected from the group consisting of alkyl groups containing from 1 to about 10 carbon atoms, aryl groups, and allyl groups, and wherein n and x represent integers from 1 to about 10, with the proviso that $R^1$ and $R^2$ can not both be hydrogen atoms.

U.S. Pat. No. 7,108,033 discloses a rubbery polymer which is comprised of repeat units that are derived from (1) at least one conjugated diolefin monomer, and (2) at least one leaving group-bearing monomer having the structural formula:

wherein R represents an alkyl group containing from 1 to about 10 carbon atoms or a hydrogen atom, wherein R' represents a methyl group containing from 1 to about 10 carbon atoms or a hydrogen atom, with the proviso that if R represents an alkyl group then R' represents a hydrogen atom, wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group.

U.S. Pat. No. 7,108,033 further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (I) a filler, and (II) rubbery polymer which is comprised of repeat units that are derived from (1) at least one conjugated diolefin monomer, and (2) at least one monomer having the structural formula:

wherein R represents an alkyl group containing from 1 to about 10 carbon atoms or a hydrogen atom, wherein R' represents a methyl group or a hydrogen atom, with the proviso that if R represents an alkyl group then R' represents a hydrogen atom, wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group.

Numerous additional patents and publications describe compositions and techniques that can be used to improve the interaction between carbon black and silica fillers. These methods include synthesizing rubbers utilizing functionalized monomers and functionalized initiators which act to improve compatibility with fillers. Other known approaches involve treating the filler with various agents to improve interaction with the rubber.

The use of cellulose as a filler in rubber formulations has been described in the literature for many years. More recently U.S. Pat. No. 9,273,195 reveals a tire comprising a cellulose ester/elastomer composition comprising: (i) at least one cellulose ester, wherein at least one cellulose ester has; (a) an inherent viscosity of about 0.2 to about 3.0 dL/g or (b) a total degree of substitution per anhydroglucose unit from about 0.5 to about 2.8; or wherein said at least one cellulose ester is a low molecular weight cellulose mixed ester selected from the group consisting of (a) a low molecular weight mixed cellulose ester having the following properties: a total degree of substitution per anhydroglucose unit of from about 3.08 to about 3.50, having the following substitutions: a degree of substitution per anhydroglucose unit of hydroxyl of no more than about 0.70; a degree of substitution per anhydroglucose unit of $C_3$-$C_4$ esters from about 0.80 to about 1.40; and a degree of substitution per anhydroglucose unit of acetyl of from about 1.20 to about 2.34; an inherent viscosity of from about 0.05 to about 0.15 dL/g, as measured in a 60/40, wt./wt., solution of phenol/tetrachloroethane at 25° C.; a number average molecular weight from about 1,000 to about 5,600; a weight average molecular weight from about 1,500 to about 10,000; and a polydispersity of from about 1.2 to about 3.5, (b) a low molecular weight mixed cellulose ester having the following properties: a total degree of substitution per anhydroglucose unit of from about 3.08 to about 3.50, having the following substitutions: a degree of substitution per anhydroglucose unit of hydroxyl of no more than about 0.70; a degree of substitution per anhydroglucose unit of $C_{3-4}$ esters from about 1.40 to about 2.45; and a degree of substitution per anhydroglucose unit of acetyl of from about 0.20 to about 0.80; an inherent viscosity of from about 0.05 to about 0.15 dL/g, as measured in a 60/40, wt./wt., solution of phenol/tetrachloroethane at 25° C.; a number average molecular weight from about 1,000 to about 5,600; a weight average molecular weight from about 1,500 to about 10,000; and a polydispersity from about 1.2 to about 3.5, and (c) a low molecular weight mixed cellulose ester having the following properties: a total degree of substitution per anhydroglucose unit of from about 3.08 to about 3.50, having the following substitutions: a degree of substitution per anhydroglucose unit of hydroxyl of no more than about 0.70; a degree of substitution per anhydroglucose unit of $C_{3-4}$ esters from about 2.11 to about 2.91, and a degree of substitution per anhydroglucose unit of acetyl of from about 0.10 to about 0.50; an inherent viscosity of from about 0.05 to about 0.15 dL/g, as measured in a 60/40, wt./wt., solution of phenol/tetrachloroethane at 25° C.; a number average molecular weight from about 1,000 to about 5,600; a weight average molecular weight from about 1,500 to about 10,000; and a polydispersity from about 1.2 to about 3.5; (ii) at least one elastomer; and (iii) at least one additive selected from the group consisting of at least one compatibilizer and at least one plasticizer, wherein said at least one cellulose ester is dispersed in said at least one elastomer, wherein said cellulose ester/elastomer composition comprises: a continuous phase comprising said at least one elastomer; and a dispersed phase comprising said at least one cellulose ester and said at least one additive. Also, see U.S. Pat. Nos. 9,708,473, 9,708,474, and 9,708,475 which further disclose the use of cellulose esters in rubber formulations, such as those for use in tires.

U.S. Pat. Nos. 7,625,970 and 7,897,662 disclose a pneumatic tire comprising at least one component having a rubber composition comprising a diene based elastomer, from 1 to 30 parts by weight per 100 parts by weight of diene based elastomer (phr) of cellulose fiber having an average length of from 15 to 25 microns, and from 1 to 20 phr of a substituted polyisoprene comprising units of formula:

wherein —R comprises hydrogen and one substituent group of the formula:

wherein the number of substituent groups of structures II occurring per substituted polyisoprene molecule ranges from 8 to 12, and the weight average molecular weight of the substituted polyisoprene ranges from 20000 to 30000.

Naturally occurring organic materials, such as cellulose, are renewable resources and are accordingly attractive as fillers for use in tires and other rubber products for that reason. However, compatibility between the organic fillers and rubber is generally poor, leading to low filler loading due to poor filler dispersion and poor adhesion between the rubber and the filler. Accordingly, organic fillers have not been widely used commercially as fillers in manufacturing rubber products. There is consequently a long felt need for a technique to improve the interaction between organic fillers and rubber formulations that can be used in making rubber products, such as tires. It is also important for such rubber formulations to provide performance characteristics that are at least as good and preferably superior to those which can be attained using conventional carbon black and silica fillers.

SUMMARY OF THE INVENTION

It has been found that certain silica/cellulose hybrid compositions can be incorporated into rubber formulations with excellent compatibility between the filler and the rubber being attained. Rubber formulations that contain these silica/cellulose hybrid compositions also offer excellent rubber performance characteristics for utilization in tires and a wide variety of other rubber products, such as hoses, power transmission belts, conveyor belts, air springs, windshield wiper blades, and the like.

The silica/cellulose compositions of this invention are made by a new and novel technique. This method for making a silica/cellulose hybrid composition more specifically comprises: (1) dispersing sodium silicate into the aqueous cellulose slurry to make an aqueous cellulose/sodium silicate dispersion; (2) maintaining the aqueous cellulose/sodium silicate dispersion under conditions of agitation for a period of time which is sufficient to allow the sodium silicate to react with the cellulose; 3) adding an acid to the cellulose/sodium silicate dispersion in an amount which is sufficient to reduce the pH of the cellulose/sodium silicate dispersion to no more than about 8 to produce the silica/cellulose hybrid; (4) recovering the silica/cellulose hybrid from the water. The aqueous cellulose slurry can be made by dispersing the cellulose into water under conditions of agitation.

This invention further discloses a method for making a silica/cellulose hybrid composition which comprises: (1) dispersing an alkoxy silane into an aqueous cellulose slurry to make an aqueous cellulose/alkoxy silane dispersion; (2) maintaining the aqueous cellulose/alkoxy silane dispersion under conditions of agitation for a period of time which is sufficient to allow the sodium silicate to react with the cellulose; (3) adding an acid to the cellulose/alkoxy silane dispersion in an amount which is sufficient to reduce the pH of the cellulose/alkoxy silane dispersion to no more than about 8 to produce the silica/cellulose hybrid; (4) recovering the silica/cellulose hybrid from the water. The aqueous cellulose slurry can be made by dispersing the cellulose into water under conditions of agitation. The subject invention also reveals a method for making a silica/cellulose hybrid composition which comprises: (1) dispersing silica into an aqueous cellulose slurry to make an aqueous cellulose/silica dispersion; (2) maintaining the aqueous cellulose/silica dispersion under conditions of agitation for a period of time which is sufficient to allow the sodium silicate to react with the cellulose; (3) adding an acid to the cellulose/silica dispersion in an amount which is sufficient to reduce the pH of the cellulose/sodium silicate dispersion to no more than about 8 to produce the silica/cellulose hybrid; (4) recovering the silica/cellulose hybrid from the water. The aqueous cellulose slurry can be made by dispersing the cellulose into water under conditions of agitation.

DETAILED DESCRIPTION OF THE INVENTION

The silica/cellulose hybrid compositions of this invention are made by a multi-step process. In the first step of this process an aqueous slurry of cellulose is provided. This aqueous slurry of cellulose is made by dispersing the cellulose in water under conditions of agitation, such as high speed mixing or stirring the aqueous medium. Typically, the level of cellulose dispersed into the water will be within the range of about 0.1 weight percent to about 20 weight percent, based upon the total weight of the cellulose slurry. In many cases, the level of cellulose dispersed into the water will be within the range of about 0.2 weight percent to about 10 weight percent, based upon the total weight of the cellulose slurry. Generally, from about 0.5 weight percent to 8 weight percent of cellulose with be dispersed into the water in making the slurry. Normally, from about 1 weight percent to 5 weight percent of cellulose with be dispersed into the water in making the slurry within being more typical to disperse 1 weight percent to 4 weight percent cellulose into the slurry. For instance, from 1.5 weight percent to 2.5 weight percent cellulose can be dispersed into the water in making the slurry.

Virtually any type of cellulose can be used in the practice of this invention. In most cases the cellulose will be in the form of fibers which are substantially or completely free of lignin. Cellulose fiber used in the practice of this invention will typically exclude those cellulosic materials containing substantial amounts of lignin, such as wood fiber. In one embodiment of this invention, cellulose fiber which contains from 95 to 99.5 percent cellulose is used. In one embodiment, the cellulose fiber has an average length of from 15 µm to 25 µm (15 to 25 microns). In another embodiment of this invention, the cellulose fiber has an average length of from 15 µm to 20 µm. In still another embodiment of this invention, the cellulose fiber has an average thickness of from 10 µm to 20 µm. In another embodiment of this invention, the cellulose fiber has an average thickness of from 12 µm to 18 µm. Suitable cellulose fiber for using in the practice of this invention is available commercially from J. Rettenmaier & Sohne GmbH as Arbocel® BE 600-10 TG.

In the practice of this invention sodium silicate is mixed into the aqueous cellulose slurry. Sodium silicate is of the general formula $Na_2Si_yO_{2y+x}$ or $(Na_2O)_x \cdot (SiO_2)_y$, and generically includes sodium metasilicate ($Na_2SiO_3$), sodium orthosilicate ($Na_4SiO_4$), and sodium pyrosilicate ($Na_6Si_2O_7$). The sodium silicate will normally be added as an aqueous solution which is sometimes referred to as water-glass, water glass, or liquid glass. The aqueous sodium silicate solution will typically contain from about 5 weight percent to about 50 weight percent sodium silicate, based upon the total weight of the aqueous sodium silicate solution. For instance, the aqueous sodium silicate solution can contain from about 10 weight percent to about 45 weight percent, 15 weight percent to about 40 weight percent, 20 weight percent to about 35 weight percent, or 25 weight percent to about 30 weight percent sodium silicate. The aqueous cellulose/sodium silicate dispersion will typically have a pH which is within the range of 10 to 12.5, will more typically have a pH which is within the range of 10.5 to 12, and generally have a pH which is within the range of 11 to 11.5.

In the alternative, silica or an alkoxy silane can be dispersed into the aqueous cellulose slurry in combination with or in place of the sodium silicate. The alkoxy silanes that can used are of the formula: $Si(OR)_4$, wherein R represents an alkyl group containing from about 1 to about 8 carbon atoms. Some representative of alkoxy silanes that can be used include, but are not limited to, tetramethoxysilane (TMOS), tetraethoxysilane (TEOS), tetrapropoxysilane, and tetrabutoxysilane.

A sufficient quantity of the silicon containing compound will normally be added to make the weight ratio of cellulose to the silicon containing compound in the dispersion to be within the range of 1:99 to 99:1. The weight ratio of cellulose to the silicon containing compound in the dispersion will normally be within the range of 10:90 to 90:10, will generally be within the range of 20:80 to 80:20, will preferably be within the range of 30:70 to 90:30, and will more preferably be within the range of 40:60 to 60:40.

The aqueous dispersion of cellulose and the silicon containing compound (sodium silicate, silica, or alkoxy silane) is then maintained under conditions of agitation at a temperature of at least about 20° C. (typically within the range of 30° C. to 120° C.). To increase the rate of reaction the dispersion is normally heated to an elevated temperature which is normally within the range of 40° C. to 90° C. and which is preferably within the range of 60° C. to 80° C. Agitation is maintained until the cellulose and the silicon containing compound have had sufficient time to react which is typically a period of 20 minutes to 4 hours and preferably about 45 minutes to 90 minutes. Then, an acid is added to reduce the pH of the dispersion to 8 or less. Typically, the pH will be reduced so as to be 7.5 or less (normally within the range of 6.5 to 7.5).

After the pH of the dispersion has been reduced the silica/cellulose hybrid can be recovered from the dispersion.

This can be accomplished by any suitable means for recovering the silica/cellulose hybrid for the water in the dispersion. For example, the silica/cellulose hybrid can be recovered by spray drying or drum drying at an elevated temperature which is typically within the range of 70° C. to 140° C. and which is more typically within the range of 90° C. to 120° C. The silica/cellulose hybrid can then be used as a reinforcing filler for rubber formulations.

The silica/cellulose hybrid will typically be incorporated into rubber formulations at a level which is within the range of 1 phr to about 150 phr (parts by weight per 100 parts by weight of rubber). In one embodiment of this invention, the silica/cellulose hybrid is incorporated into the rubber at a level which is within the range of 2 phr to 60 phr. In another embodiment of this invention, the silica/cellulose hybrid is incorporated into the rubber at a level which is within the range of 5 phr to 30 phr. In another embodiment, the silica/cellulose hybrid is incorporated into the rubber formulation at a level which is within the range of 10 phr to 20 phr.

The rubber into which the silica/cellulose hybrid is incorporated will normally containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one embodiment of this invention the rubber formulation is comprised of at least two diene based rubbers. For example, a combination of two or more rubbers may be preferred, such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers. In one aspect of this invention, an emulsion polymerization derived styrene/butadiene (E-SBR) might be used having a relatively conventional styrene content of about 20 to about 30 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer. Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium initiation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content. Cis 1,4-polyisoprene and cis 1,4-polyisoprene natural rubber are well known to those having skill in the rubber art.

The another embodiment of this invention the silica/cellulose hybrid is incorporated into a substituted polyisoprene rubber in accordance with the teachings of U.S. Pat. Nos. 7,625,970 and 7,897,662. This substituted polyisoprene rubber is comprised of repeat units of formula:

wherein —R comprises hydrogen and one substituent group of the formula:

wherein the number of substituent groups of structures II occurring per substituted polyisoprene molecule ranges from 8 to 12, and the weight average molecular weight of the substituted polyisoprene ranges from 20000 to 30000. The teachings of U.S. Pat. Nos. 7,625,970 and 7,897,662 are incorporated herein by reference in their entirety.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable vegetable oils include soybean oil and corn oil. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

Rubber compositions which are reinforced with the silica/cellulose hybrids of the present invention can also contain other inorganic and/or organic fillers. Some representative examples of such fillers include carbon black and silica as well as inorganic fillers, such as aluminum hydroxide, calcium carbonate, mica, talc, aluminum oxide, titanium oxide, and barium sulfate, and organic fillers, such as conventional cellulose, lecithin, lignin, and dendrimers.

The rubber composition may include from about 10 to about 150 phr of silica. In another embodiment, from 20 to 80 phr of silica may be used. The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of about 100 to about 400, alternatively about 150 to about 300. The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 phr to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 phr to 30 phr.

In one embodiment the rubber composition may contain a conventional sulfur containing organosilicon compound. Examples of suitable sulfur containing organosilicon compounds are of the formula:

in which Z is selected from the group consisting of:

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis (methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore as to formula I, preferably Z is where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound in a rubber composition will vary depending on the level of silica that is used. Generally speaking, the amount of the compound of formula I will range from about 0.01 to about 1.0 parts by weight per part by weight of the silica. Preferably, the amount will range from about 0.02 to about 0.4 parts by weight per part by weight of the silica. More preferably the amount of the compound of formula I will range from about 0.05 to about 0.25 parts by weight per part by weight of the silica.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 phr to 8 phr, alternatively with a range of from 1.5 phr to 6 phr. Typical amounts of tackifier resins, if used, comprise about 0.5 phr to about 10 phr, usually about 1 phr to about 5 phr. Typical amounts of processing aids comprise about 1 phr to about 50 phr. Typical amounts of antioxidants comprise about 1 phr to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 phr to 5 phr. Typical amounts of fatty acids, if used, which can include stearic acid comprise about 0.5 phr to about 3 phr. Typical amounts of zinc oxide comprise about 2 phr to about 5 phr. Typical amounts of waxes comprise about 1 phr to about 5 phr. Microcrystalline waxes can be used. Typical amounts of peptizers comprise about 0.1 phr to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 phr to about 4 phr, alternatively about 0.8 phr to about 1.5, phr. In another embodiment, combinations of a primary and a secondary accelerator might be used with the secondary accelerator being used in smaller amounts, such as from about 0.05 phr to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of a tire. For example, the rubber component may be a tread (including tread cap and tread base), sidewall, apex, chafer, sidewall insert, wirecoat or innerliner. In one embodiment, the component is a tread. The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias tire.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Figure 1:
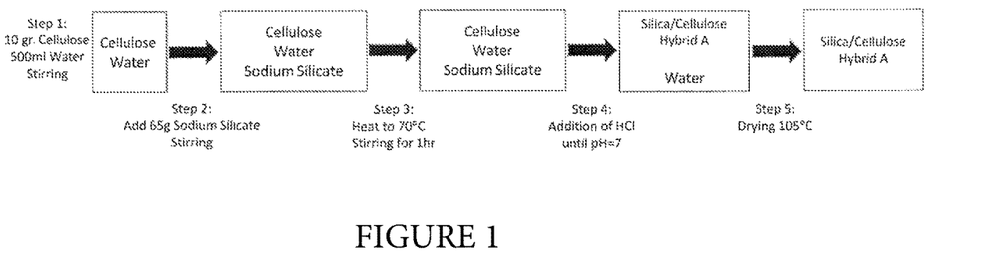
FIG. 1 illustrates the method used in making the silica/cellulose hybrid composition of this invention as described in Example 1.

In this experiment a silica/cellulose hybrid composition was made utilizing the procedure generally outlined in FIG. 1. In the procedure used 10 grams of cellulose was mixed into 500 ml of water with vigorous stirring to make an aqueous cellulose slurry. Then, 65 grams of an aqueous sodium silicate solution containing about 28.5 weight percent $SiO_2$ and having a pH of about 11.3 was added with the stirring being continued. The temperature of the dispersion made was then increased to 70° C. with the stirring being continued. After 1 hour hydrochloric acid was added until the pH of the dispersion was reduced to about 7. Then the silica/cellulose hybrid was recovered and dried at a temperature of about 105° C. The silica/cellulose hybrid recovered was identified a Sample A.

Example 2

Figure 2:
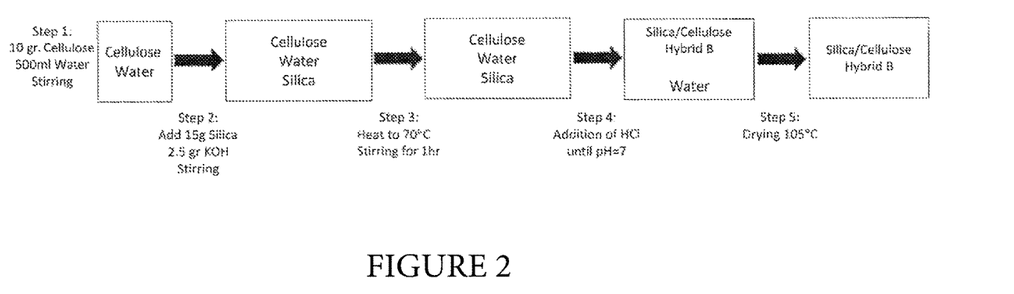
FIG. 2 illustrates the method used in making the silica/cellulose hybrid composition of this invention as described in Example 2.

In this experiment a silica/cellulose hybrid composition was made utilizing the procedure generally outlined in FIG. 2. In the procedure used 10 grams of cellulose was mixed into 500 ml of water with vigorous stirring to make an aqueous cellulose slurry. Then, 15 grams of silica and 2.5 grams of potassium hydroxide were added with the stirring being continued. The temperature of the dispersion made was then increased to 70° C. with the stirring being continued. After 1 hour hydrochloric acid was added until the pH of the dispersion was reduced to about 7. Then the silica/cellulose hybrid was recovered and dried at a temperature of about 105° C. The silica/cellulose hybrid recovered was identified a Sample B.

The silica/cellulose hybrids made in Example 1 (Sample A) and Example 2 (Sample B) were then used in reinforcing a rubber formulation containing 70% styrene-butadiene rubber (SBR) and 30% high-cis-1,4-polybutadiene rubber (PBD). A control made without including any cellulose (Control 1) and a control which was reinforced with conventional silica (Control 2) were also made and cured for evaluation. The specifics of the rubber formulations made are delineated in Table 1 with all levels being reported in phr. It should be noted that Hybrid A-1 contained the same levels of cellulose and silica as did Control 2.

TABLE 1

Rubber Formulations

|  | Control 1 | Control 2 | Hybrid A-1 | Hybrid A-2 | Hybrid B |
|---|---|---|---|---|---|
| Non-Productive Ingredients | | | | | |
| SBR | 70 | 70 | 70 | 70 | 70 |
| BPD[1] | 30 | 30 | 30 | 30 | 30 |
| Silica[2] | 65 | 57 | 45 | 25 | 25 |
| Silica Coupling Agent[3] | 6.5 | 6.5 | 6.5 | 6.5 | 6.5 |
| Antioxidant | 2 | 2 | 2 | 2 | 2 |
| Zinc Oxide | 2 | 2 | 2 | 2 | 2 |
| Wax | 1.5 | 1.5 | 1.5 | 1.5 | 1.5 |
| Stearic Acid | 3 | 3 | 3 | 3 | 3 |
| N330 carbon black | 5 | 5 | 5 | 5 | 5 |
| Processing Oil | 15 | 15 | 15 | 15 | 15 |
| Cellulose |  | 8 |  |  |  |
| Hybrid A |  |  | 20 | 40 |  |
| Hybrid B |  |  |  |  | 40 |
| Productive Ingredients | | | | | |
| Antioxidant | 0.5 | 0.5 | 0.5 | 0.5 | 0.5 |
| CBS Accelerator[4] | 1.5 | 1.5 | 1.5 | 1.5 | 1.5 |
| Sulfur | 1.5 | 1.5 | 1.5 | 1.5 | 1.5 |
| DPG[5] | | | | | |

1—Budene® 1207 high cis-1,4-polybutadiene rubber from The Goodyear Tire & Rubber Company
2—Zeosil 1165MP silica
3—Si69
4—cyclohexylbenzothiazole sulfenamide
5—1,3-diphenylguanidine The cured rubber samples were evaluated for physical properties with the results being reported in Table 2.

TABLE 2

| | Control 1 | Control 2 | Hybrid A-1 | Hybrid A-2 | Hybrid B |
|---|---|---|---|---|---|
| | Cured Rubber Properties | | | | |
| G' @0.833 Hz (KPa) | 295.0 | 227.0 | 219.5 | 199.5 | 220.5 |
| Tan δ @ 0.833 Hz | 0.567 | 0.643 | 0.72 | 0.831 | 0.752 |
| S' @ Min S' ML (dNm) | 1.9 | 1.4 | 1.3 | 1.1 | 1.2 |
| S' @ Max S' MH (dNm) | 13.4 | 11.9 | 12.5 | 11.4 | 12.1 |
| Time @ 90% cure (min) | 7.4 | 8.7 | 6.7 | 5.5 | 10.3 |
| G' @ 10% (kPa) | 1692.0 | 1496.4 | 1638.9 | 1523.5 | 1616.8 |
| Tan δ 10% | 0.115 | 0.103 | 0.078 | 0.061 | 0.080 |
| Normalized Modulus @100 | 100 | 109 | 120 | 108 | 109 |
| Normalized Tensile Strain @ Max | 100 | 108 | 95 | 88 | 123 |

As can be seen by reviewing Table 2, the rubber formulations made with the silica/cellulose hybrids showed significantly lower tan δ values than did the controls. This is indicative of lower levels of hysteresis which means that tires having treads and other components which are reinforced with the silica/cellulose hybrids of this invention will provide a lower level of rolling resistance and better fuel economy than tires which are reinforced with conventional silica and carbon black. As can again be seen from Table 2 this improvement in hysteresis is achieved without compromising other important rubber characteristics, such as modulus.

While certain representative embodiments and details have been shown for the purpose of illustrating the subject invention, it will be apparent to those skilled in this art that various changes and modifications can be made therein without departing from the scope of the subject invention.

What is claimed is:

1. A method for making a silica/cellulose hybrid composition comprising the steps of: (1) dispersing sodium silicate or an alkoxy silane into an aqueous cellulose slurry to make an aqueous cellulose dispersion, wherein the cellulose in the aqueous cellulose dispersion has an average length which is within the range of 15 μm to 25 μm; (2) maintaining the aqueous cellulose dispersion under conditions of agitation for a period of time which is sufficient to allow the sodium silicate or the alkoxy silane to react with the cellulose, wherein the aqueous cellulose dispersion is maintained at a pH which is within the range of 10 to 12.5; (3) adding an acid to the cellulose dispersion in an amount which is sufficient to reduce the pH of the cellulose dispersion to no more than about 8 to produce the silica/cellulose hybrid; and (4) recovering the silica/cellulose hybrid from the water.

2. The method of claim 1 wherein sodium silicate is dispersed into the aqueous cellulose slurry in step (1).

3. The method of claim 1 wherein an alkoxy silane is dispersed into the aqueous cellulose slurry in step (1).

4. The method of claim 3 wherein the alkoxy silane is of the formula: $Si(OR)_4$, wherein R represents an alkyl group containing from about 1 to about 8 carbon atoms.

5. The method of claim 4 wherein the aqueous cellulose dispersion is maintained in step (2) at a temperature which is within the range of 20° C. to 120° C.

6. The method of claim 5 wherein a sufficient amount of acid is added in step (3) to reduce the pH of the cellulose dispersion so as to be within the range of 6.5 to 7.5.

7. The method of claim 3 wherein the alkoxy silane is selected from the group consisting of tetramethoxysilane, tetraethoxysilane, tetrapropoxysilane, and tetrabutoxysilane.

8. The method of claim 5 wherein the weight ratio of cellulose to the alkoxy silane in the aqueous dispersion is within the range of 10:90 to 90:10.

9. The method of claim 8 wherein the level of cellulose in the aqueous cellulose slurry is within the range of 0.1 weight percent to 10 weight percent, based upon the total weight of the aqueous cellulose slurry, and wherein the aqueous dispersion is maintained in step (2) at a temperature which is within the range of 30° C. to 90° C., and at a pH which is within the range of 10.5 to 12.

10. The method of claim 9 wherein the weight ratio of cellulose to the alkyl silane in the aqueous dispersion is within the range of 20:80 to 80:20.

11. The method of claim 1 wherein the cellulose in the aqueous cellulose dispersion has an average thickness which is within the range of 12 μm to 18 μm and wherein the aqueous cellulose dispersion is maintained in step (2) at a temperature which is within the range of 20° C. to 120° C.

12. The method of claim 11 wherein a sufficient amount of acid is added in step (3) to reduce the pH of the cellulose dispersion so as to be within the range of 6.5 to 7.5.

13. The method of claim 11 wherein the weight ratio of cellulose to the sodium silicate in the aqueous dispersion is within the range of 10:90 to 90:10.

14. The method of claim 13 wherein the level of cellulose in the aqueous cellulose slurry is within the range of 0.1 weight percent to 10 weight percent, based upon the total weight of the aqueous cellulose slurry, and wherein the aqueous dispersion is maintained in step (2) at a temperature which is within the range of 30° C. to 90° C., and at a pH which is within the range of 10.5 to 12.

15. The method of claim 14 wherein the weight ratio of cellulose to sodium silicate in the aqueous dispersion is within the range of 20:80 to 80:20.

16. A method for making a silica/cellulose hybrid composition comprising the steps of: (1) dispersing sodium silicate or an alkoxy silane into an aqueous cellulose slurry to make an aqueous cellulose dispersion, wherein the cellulose in the aqueous cellulose dispersion has an average length which is within the range of 15 μm to 25 μm and an average thickness which is within the range of 12 μm to 18 μm, wherein the weight ratio of cellulose to sodium silicate in the aqueous dispersion is within the range of 30:70 to 70:30, and wherein the level of cellulose in the aqueous cellulose slurry is within the range of 1 weight percent to 4 weight percent, based upon the total weight of the aqueous cellulose slurry; (2) maintaining the aqueous cellulose dispersion under conditions of agitation for a period of time which is sufficient to allow the sodium silicate or the alkoxy silane to react with the cellulose, wherein the aqueous cellulose dispersion is maintained at a pH which is within the range of 10 to 12.5; (3) adding an acid to the cellulose dispersion in an amount which is sufficient to reduce the pH of the cellulose dispersion to no more than about 8 to produce the silica/cellulose hybrid; and (4) recovering the silica/cellulose hybrid from the water.

17. The method of claim 16 wherein the weight ratio of cellulose to sodium silicate in the aqueous dispersion is within the range of 40:60 to 60:40, and wherein the level of cellulose in the aqueous cellulose slurry is within the range of 1.5 weight percent to 2.5 weight percent, based upon the total weight of the aqueous cellulose slurry.

18. The method of claim 17 wherein the acid is hydrochloric acid.

19. A method for making a silica/cellulose hybrid composition comprising the steps of: (1) dispersing sodium silicate or an alkoxy silane into an aqueous cellulose slurry to make an aqueous cellulose dispersion, wherein the aqueous cellulose dispersion consists essentially of water, the sodium silicate or the alkoxy silane, and the cellulose, wherein the cellulose in the aqueous cellulose dispersion has an average length which is within the range of 15 μm to 25 μm; (2) maintaining the aqueous cellulose dispersion under conditions of agitation for a period of time which is sufficient to allow the sodium silicate or the alkoxy silane to react with the cellulose, wherein the aqueous cellulose dispersion is maintained at a pH which is within the range of 10 to 12.5; (3) adding an acid to the cellulose dispersion in an amount which is sufficient to reduce the pH of the cellulose dispersion to no more than about 8 to produce the silica/cellulose hybrid; and (4) recovering the silica/cellulose hybrid from the water.

20. The method of claim 19 wherein the level of cellulose in the aqueous cellulose slurry is within the range of 1.5 weight percent to 2.5 weight percent, based upon the total weight of the aqueous cellulose slurry.

* * * * *